United States Patent
Kimura

(10) Patent No.: US 7,417,085 B2
(45) Date of Patent: *Aug. 26, 2008

(54) THERMOPLASTIC RESIN COMPOSITION

(75) Inventor: Kenji Kimura, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 225 days.

This patent is subject to a terminal disclaimer.

(21) Appl. No.: 11/062,770

(22) Filed: Feb. 22, 2005

(65) Prior Publication Data

US 2005/0192393 A1 Sep. 1, 2005

(30) Foreign Application Priority Data

Feb. 26, 2004 (JP) ............................. 2004-051172

(51) Int. Cl.
*C08K 5/00* (2006.01)
(52) U.S. Cl. ......................................... 524/108; 524/83
(58) Field of Classification Search ............... 524/83, 524/108
See application file for complete search history.

(56) References Cited

U.S. PATENT DOCUMENTS 5,717,013 A * 2/1998 Ichiyanagi et al. .......... 524/108

FOREIGN PATENT DOCUMENTS

JP 4-220443 8/1992
JP 2003-253061 9/2003

* cited by examiner

*Primary Examiner*—Peter D Mulcahy
(74) *Attorney, Agent, or Firm*—Foley & Lardner LLP

(57) ABSTRACT

There are disclosed a thermoplastic resin composition, consisting essentially of:
100 parts by weight of a thermoplastic resin,
(A) 0.001 to 1 part by weight of at least one antioxidant selected from compounds of formula (A-I):

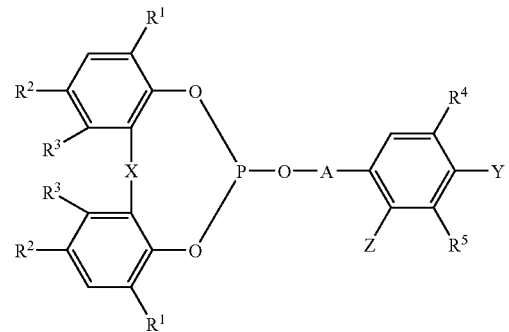

wherein $R^1$, $R^2$, $R^4$ and $R^5$ independently represent hydrogen, $C_{1-8}$ alkyl, $C_{5-8}$ cycloalkyl, or the like, $R^3$ represents hydrogen, $C_{1-8}$ alkyl, or the like, X represents a single bond, or the like, (B) 0.001 to 150 parts by weight of an inorganic anti-blocking agent having a solid acid in the amount of 100 μmol or less per 1 g of the inorganic anti-blocking agent, and an optionally selected agent(s).

5 Claims, No Drawings

THERMOPLASTIC RESIN COMPOSITION

FILED OF THE INVENTION

The present invention relates to a thermoplastic resin composition.

BACKGROUND OF THE INVENTION

Thermoplastic resins have versatile utility and are used, for example, as packaging material film. The processing of the thermoplastic resin into a film is typically conducted by melt-kneading thermoplastic resin mixed with a certain phosphorous antioxidant, and an anti-blocking agent to prevent thermal oxidation of the thermoplastic resin and blocking of the formed films.

JP2003-253061A discloses at paragraphs 34 and 37 to 50 a composition containing polyethylene resin, a phosphorous antioxidant, a hindered amine light stabilizer having at least one triazine ring, and anti-blocking agents such as aluminosilicate and kaolin.

It is also disclosed in JP4-220443A a polyolefin resin suitably used for films containing 0.01 to 3.0 parts by weight of an inorganic anti-blocking agent having surface —OH groups in the amount of 200 μmol or less per g of the anti-blocking agent as measured by the method of using triethyl aluminum disclosed in paragraphs 7 to 8 of the document, and 0.01 to 0.3 part by weight of aliphatic acid amide where the measurement of the surface —OH group was conducted by the steps of charging in a 100 ml flask 2 g of a sample of the anti-blocking agent, which had been dried in a desiccators under vacuum at 120° C. for 2 hours and then left standing and cooled to room temperature, adding 40 ml of dehydrated toluene thereto, replacing the atmosphere of the flask with dry nitrogen gas, adding 11 vol % triethyl aluminium solution in toluene under stirring thereto, measuring the amount of ethane gas produced by the reaction with the surface —OH group of the anti-blocking agent and tiethyl aluminium, and the calculation was made according to the following equation:

$$n' = P'V/RTW$$

wherein n' represents the number of surface —OH group (mol/g), P' represents pressure(atm), V represents the amount of evolved ethane (l: liter), R represents gas constant(atm·l/mol·° K), T represents ° K, and W represents the weight amount of the sample (g).

DETAILED DESCRIPTION OF THE INVENTION

Thermoplastic resin compositions according to the present invention containing a specific anti-blocking agent having suitable acidity and a antioxidant as below show better hydrolysis resistance, and less deterioration during kneading. The composition of the invention can be stored for a longer period of time without requiring specific vapor proof wrapping material for storage and it is therefore suitable for an efficient production of films from the thermoplastic resins.

An aspect of the invention relates to a thermoplastic resin composition, consisting essentially of:
  100 parts by weight of a thermoplastic resin,
  (A) 0.001 to 1 part by weight of at least one antioxidant selected from the group consisting of:
    compounds of formula (A-I):

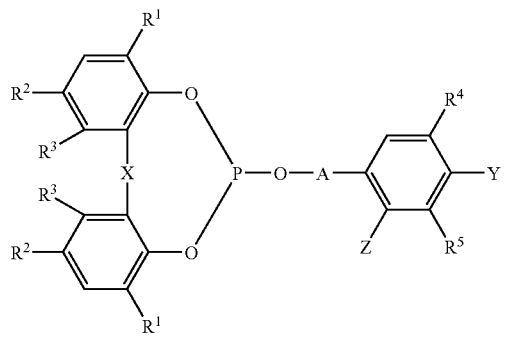

wherein $R^1$, $R^2$, $R^4$ and $R^5$ independently represent hydrogen, $C_{1-8}$ alkyl, $C_{5-8}$ cycloalkyl, $C_{6-12}$ alkylcycloalkyl, $C_{7-12}$ aralkyl, or phenyl,
$R^3$ represents hydrogen, or $C_{1-8}$ alkyl,
X represents a single bond, sulfur atom, or —$CHR^6$—,
  wherein $R^6$ represents hydrogen, $C_{1-8}$ alkyl, or $C_{5-8}$ cycloalkyl,
A represents $C_{2-8}$ alkylene, or a group of formula:
*—$COR^7$—, wherein $R^7$ represents a single bond or $C_{1-8}$ alkylene, and the bond indicated by * means that said bond is connected with the phosphite oxygen atom of the formula (A-I),
either one group of Y and Z represents hydroxyl, $C_{1-8}$ alkoxy, or $C_{7-12}$ aralkyloxy, and the other group represents hydrogen or $C_{1-8}$ alkyl, and
provided that when Y is hydroxyl one of $R^4$ and $R^5$ represents $C_{3-8}$ alkyl, $C_{5-8}$ cycloalkyl, $C_{6-12}$ alkylcycloalkyl, $C_{7-12}$ aralkyl or phenyl, and two $R^1$ groups, two $R^2$ group and two $R^3$ groups each may be the same or different,
  (B) 0.001 to 150 parts by weight of an inorganic anti-blocking agent having a solid acid in the amount of 100 μmol or less per 1 g of the inorganic anti-blocking agent, and optionally
  (c) at least one additive selected from the group consisting of: phenolic antioxidants, phosphorus type antioxidants (other than (A) above), lubricants, anti-static agents, and pigments.

Another aspect of the invention relates to a process for producing the thermoplastic resin composition defined above, which comprises mixing
  100 parts by weight of the thermoplastic resin as defined above,
  (A) 0.001 to 1 part by weight of an antioxidant selected from the compounds of formula (A-I),
  (B) 0.001 to 150 parts by weight of the inorganic anti-blocking agent as defined above, and optionally
  (C) at least one additive selected from the group consisting of:
    phenolic antioxidants, phosphorus type antioxidants, lubricants, anti-static agents, and pigments, and
    melt-kneading the resulting mixture.

Examples of the thermoplastic resin include, for example,
  (1) polyethylene such as high-density polyethylene (HD-PE), low-density polyethylene (LD-PE) or linear low-density polyethylene (LLDPE)
  (2) polypropylene
  (3) methylpentene polymer
  (4) EEA (ethylene/ethyl acrylate copolymer) resin
  (5) ethylene/vinyl acetate copolymer resin
  (6) polystyrenes such as polystyrene, poly(p-methylstyrene) or poly(a-methylstyrene)

(7) AS (acrylonitrile/styrene copolymer) resin
(8) ABS (acrylonitrile/butadiene/styrene copolymer) resin
(9) AAS (special acrylic rubber/acrylonitrile/stvrene copolymer) resin
(10) ACS (acrylonitrile/chlorinated polyethylene/styrene copolymer) resin
(11) chlorinated polyethylene, polychloroprene, chlorinated rubber
(12) polyvinyl chloride, polyvinylidene chloride
(13) methacrylic resin
(14) etyhylene/vinyl alcohol copolymer resin
(15) fluororesin
(16) polyacetal
(17) grafted polyphenylene ether resin and polyphenylene sulfide resin
(18) polyurethane
(19) polyamide
(20) polyester resin such as polyethylene terephthalate or polybutylene terephthalate
(21) polycarbonate
(22) polyacrylate
(23) polysulfone, polyether ether ketone, polyether sulfone
(24) aromatic polyester resin, etc.
(25) diallyl phthalate prepolymer
(26) silicone resin
(27) 1,2-polybutaduene
(28) polyisoprene
(29) styrene/butadiene copolymer
(30) butadiene/acrylonitrile copolymer
(31) ethylene/propylene copolymer
(32) ethylene/MMA(methylmethacrylate) copolymer The thermoplastic resin can be used alone or in combination thereof.

Among the thermoplastic resin, the polyolefin such as polyethylene (e.g. HD-PE, LD-PE, LLDPE, etc.) or polypropylene, copolymers of ethylene and vinyl acetate, copolymers of ethylene and MMA, polystyrene type resin such as GP-PS, HI-PS, SBS, SIS, SIBS, MS, MBS, ABS and the like, and the engineering resin such as polyamide, polyethylene terephthalate, polybutylene terephthalate or polycarbonate, are preferably used in the present invention.

Especially, more preferable resin is the polyolefin and the polystyrene.

The preparation method of the polyolefin is not specifically limited. For example, they may be those obtained by the radical polymerization or those produced by the polymerization using a catalyst containing a metal of Group IVb, Vb, VIb or VIII of the Periodic Table of Elements. The catalyst containing such a metal may be a metal complex having by one or more coordinated ligands such as an oxide which is coordinated by a π- or σ-bond, a halogenated compound, an alcoholate, an ester, an aryl or the like, and the complex may be used as it is, or may be used with a base material such as magnesium chloride, titanium chloride, alumina, silicon oxide, etc. as the carrier of the complex.

As the polyolefin, for example, preferably used are those produced by using Ziegler-Natta catalyst, metallocene catalyst, Phillips catalyst and the like.

Also the engineering resin is not specifically limited. The polyamide resin may be those having an amide bond at the polymer chain and can be molten with heating. For example, they may be produced by any method such as condensation reaction between diamines and dicarboxylic acids, condensation reaction of aminocarboxylic acids and ring opening polymerization of lactams. Typical examples thereof include nylon 66, nylon 69, nylon 610, nylon 612, poly-bis(p-aminocyclohexyl)methanedodecamide, nylon 46, nylon 6, nylon 12 and copolymers (e.g. nylon 66/6 as a copolymer of nylon 66 and nylon 6, nylon 6/12, etc.).

The polyester resin may be those having an ester bond at the polymer chain and can be molten with heating. Examples thereof include polyester obtained by the polycondensation between dicarboxylic acids and a dihydroxy compound. The polyester may be a homopolyester or a copolyester.

The polycarbonate may be those having a carbonate bond at the polymer chain and can be molten with heating. Examples thereof include polycarbonate obtained by reacting an aromatic hydroxy compound and/or a small amount of polyhydroxy compound with a carbonate precursor such as phosgene, diphenyl carbonate, etc. in the presence of a solvent, an acid receptor and a molecular weight adjustor. The polycarbonate resin may be straight-chain or branched resin, or may be a copolymer.

In the antioxidant compound of formula (A-I),
$R^1$ and $R^2$ are preferably $C_{1-8}$ alkyl, $C_{5-8}$ cycloalkyl, or $C_{6-12}$ alkylcycloalkyl.
$R^4$ is preferably i-propyl, i-butyl, sec-butyl, t-butyl, t-pentyl, i-octyl, t-octyl, cyclohexyl, 1-methylcyclohenxyl or 2-ethylhexyl.
$R^5$ is preferably hydrogen, or $C_{1-5}$ alkyl such as methyl, ethyl, n-propyl, i-propyl, n-butyl, i-butyl, sec-butyl, t-butyl or t-pentyl.
$R^3$ is preferably hydrogen or $C_{1-5}$ alkyl.
X is preferably a single bond, sulfur, or methylene.
A is preferably propylene, *—CO—, or *—COCH$_2$CH$_2$—, wherein * means that the bond indicated by * is bonded with the phosphite oxygen atom in formula (A-I).
Y is preferably hydroxyl group.
Z is preferably hydrogen or $C_{1-8}$ alkyl.
Preferred examples of the antioxidant above are
6-[3-(3-t-butyl-4-hydroxy-5-methylphenyl)propoxy]-2,4,8,10-tetra-t-butyl-dibenz[d,f]1,3,2]dioxaphosphepin, hereinafter referred to as A-2,
6-[3-(3,5-di-t-butyl-4-hydroxyphenyl)propoxy]-2,4,8,10-tetra-t-butyldi-benz[d,f][1,3,2]dioxaphosphepin,
6-[3-(3,5-di-t-butyl-4-hydroxyphenyl)propoxy]-4,8-di-t-butyl-2,10-dimethyl-12H-dibenz[d,g][1,3,2]dioxaphosphocin, and
6-[3-(3,5-di-t-butyl-4-hydroxyphenyl)propoxy]-4,8-di-t-butyl-2,10-dimethyl-12H-dibenz[d,g][1,3,2]dioxaphosphocin.

Among these compounds, particularly preferred is A-2 in terms of hydrolysis resistance in the thermoplastic resin composition.

The at least one antioxidant (A) is used in the amount of 0.001 to 1 part by weight, preferably 0.01 to 0.5 part by weight, more preferably 0.05 to 0.2 part by weight per 100 parts by weight of the thermoplastic resin. Incorporation of more than 1 part by weight of the antioxidant is not so advantageous in view of economy and efficacy.

The mixing method of the antioxidant (A) and the thermoplastic resin is not particularly limited. The antioxidant (A) may be directly mixed with the thermoplastic resin, or may be mixed with the thermoplastic resin by using a master batch containing the antioxidant (A) in a higher concentration, or by kneading a heat melted antioxidant (A) which had been added directly through a side-feeder equipped to an extruder.

The solid acid of the inorganic anti-blocking agent is typically titrated to calculate the amount thereof in a similar manner as described in "Design of the resin for pigment dispersion" by Toshikatsu KOBAYASHI et al described in Sikizai 61(12), 692-698, (1988).

The typical procedure is as follows:

2 g of Anti-blocking agent is charged in a sedimentation tube, and 50 ml of 0.02 N diethanolamine solution in methyl isobutyl ketone were added thereto and the resulting mixture was subjected to ultrasonic dispersion for 1 hr. Then obtained solution was subjected to centrifugation at 13000 rpm for 30 min to give a supernatant. 10 ml of the supernatant were diluted with 100 ml of methyl isobutyl ketone. The diluted solution was back-titrated with 0.01 N perchloric acid solution in methyl isobutyl ketone, and the amount (μmol) of the solid acid per g of the anti-blocking agent is determined.

Preferred is the inorganic anti-blocking agent having a solid acid in the amount of 50 μmol or less per 1 g of the inorganic anti-blocking agent, and more preferred is the inorganic anti-blocking agent having a solid acid in the amount of 15 μmol or less per 1 g of the inorganic anti-blocking agent.

Among the inorganic anti-blocking agent, preferred is the inorganic anti-blocking agent having an average particle diameter of from 0.1 to 30 μm.

Examples of the inorganic anti-blocking agent include, for example, synthetic silica, diatomaceous earth, aluminosilicate, calcium silicate, sodium aluminosilicate, sodium calcium alumiosilicate, and Silton JC-30, Silton AMT-30, Insulite MC-6 and the like manufactured by Mizusawa Industrial Chemicals Company, Ltd, and Dicalite WF manufactured by Grefco, Minerals, Inc.

The inorganic anti-blocking agent or agents can be used in the present invention and the amount thereof is usually 0.001 to 150 parts by weight, preferably 0.01 to 100 parts by weight, yet more preferably 0.05 to 20 parts by weight per 100 parts by weight of the thermoplastic resin.

The method for mixing the inorganic anti-blocking agent is not particularly limited. Preferably the inorganic anti-blocking agent is directly mixed with the thermoplastic resin as it is or it is mixed with the thermoplastic resin in a form of a master batch containing the incorporated inorganic anti-blocking agent in a higher concentration.

Followings are examples of the optional additive or additives selected from the group consisting of neutralizing agents, lubricants, anti-static agents, pigments, phenolic antioxidants and phosphorus type antioxidants.

Phenolic anti-oxidants:
2,6-t-butyl-4-methylphenol,
n-octadecyl 3-(3,5-di-t-butyl-4-hydroxyphenyl)propionate,
pentaerythrytyl tetrakis(3-(3,5-di-t-butyl-4-hydroxyphenyl) propionate,
triethyele glycol bis(3-(3-t-butyl-5-methyl-4-hydroxyphenyl)propionate),
1,3,5-trimethyl-2,4,6-tris(3,5-di-t-butyl-4-hydroxybenzyl) benzene,
tris(3,5-di-t-butyl 4-hydroxybenzyl)isocyanurate,
3,9-bis(2-(3-(3-t-butyl-4-hydroxy-5-methylphenyl)propionyloxy)-1,1-di-methylethyl)-2,4,8,10-tetraoxaspiro[5.5] undecane,
2,2'-methylenebis(6-t-butyl-4-methylphenol),
4,4'-butylidenenebis(6-t-butyl-3-methylphenol),
4,4'-thiobis(6-t-butyl-3-methylphenol),
2-t-butyl-6-(3-t-butyl-2-hydroxy-5-methylbenzyl)-4-methylphenyl acrylate,
2-(1-(2-hydroxy-3,5-t-amylphenyl)ethyl)-4,6-di-t-amylphenyl acrylate and the like.

Phosphorus type antioxidants:
tris(2,4-di-t-butylphenyl)phosphite, hereinafter referred to as A-1,
tetrakis(2,4-di-t-butylphenyl)-4,4'-biphenylenediphosphonite,
tetrakis(2,4-di-t-butyl-5-methylphenyl)-4,4'-diphenylene-diphosphonite,
bis(2,4-di-t-butylphenyl)pentaerythrityl diphosphite, and
bis(2,6-di-t-butyl-4-methylphenyl)pentaerythrityl diphosphite and the like.

Neutralizing agents:
Calcium stearate, calcium hydroxide and the like.

Lubricants:
Erucic amide, stearylamide, oleoylamide, bephenylamide, N-stearylbutyrylamide, N-stearyllaurylamide, N-stearylstearylamide, N-stearylbehenylamide, N-oleoyldeoylamide, N-oleoylbehenylamide, N-butylerucic amide, N-octylerucic amide, N-lauryl erucic amide, ethylenbisstearylamide, ethylenebisoleylamide, hexamethylenebisoleylamide, N,N'-dioleyladipic amide, N,N'-dioleylsebacic amide, paraffin, polyethylene wax, stearic acid, butyl stearate, hardened ricinus, stearyl alcohol, calcium stearate and the like.

Anti-static agents:
Cationic anti-static agents such as primary amine salts, tertiary amine salts, quaternary amine salts, pyridine derivatives or the like.

Anionic anti-static agents such as sulfated oils, soap, sulfated ester oils, sulfated amide oils, sulfated olefin ester salts, sulfated aliphatic alcohol ester salts, sulfated alkyl ester salts, aliphatic acid ethyl sulfonate salts, alkylnaphthalenesulfonate salts, alkylbenzenesulfonate salts, succinate ester sulfonate salts, phosphate ester salts, or the like.

Non-ionic anti-static agents such as partial aliphatic acid ester of polyhydroxy alcohol, ethylene oxide adducts of aliphatic alcohol, ethylene oxide adducts of aliphatic acid, ethylene oxide adducts of aliphatic amine or aliphatic amide, ethylene oxide adduct of alkylphenol, ethylene oxide adduct of partial aliphatic acid ester of polyhydroxy alcohol, polyethylene glycol or the like.

Amphoteric anti-static agents such as carboxylic acid derivatives, imidoline derivatives or the like.

Pigments:
Carbon black, Titanium dioxide, Red oxide, Phthalocyanine pigment, Azo-pigment and the like.

The at least one additive is optionally used in a suitable amount in the present invention and is, for example, used in the amount of up to 10 parts by weight per 100 parts by weight of the thermoplastic resin.

The thermoplastic resin composition of the present invention, which is not containing the hindered amine light stabilizer(s) having at least one triazine ring shows good resistance to discoloration caused, for example, by exposure to NOx gas, humidity, heat, combustion gas or the like during storage.

The machine that may be used to produce the resin composition of the present invention is not particularly limited and examples thereof include, for example, a mixer such as tumbler mixer, Henschel mixer, super mixer, mono-axis or multi-axis extruder, kneader, bambury mixer and the like.

The thermoplastic resin of the present invention can be prepared, for example, by uniformly mixing the thermoplastic resin, the anti-oxidant, the inorganic anti-blocking agent and an optional phenolic or phosphorus type anti-oxidant other than the antioxidant (A), lubricants, anti-static agents, or pigments with a mixer such as tumbler mixer, Henschel mixer, or super mixer, and then melt-kneading the mixture with a mono-axis or multi-axis extruder to produce granules or with a kneader or bambury mixer and granulate thereafter with an extruder.

EXAMPLE

The present invention will be explained in more detail by way of examples and comparative examples, but is not to be construed to limit the invention thereto.

Phosphorous Type Antioxidant
A-1: tris(2,4-di-t-butylphenyl)phosphate

Antioxidant
A-2: 6-[3-(3-t-butyl-4-hydroxy-5-methylphenyl)propoxy]-2,4,8,10-tetra-t-butyldibenz[d,f][1,3,2]dioxaphosphepin Inorganic Anti-Blocking Agent
B-1: Sodium calcium aluminosilicate with a trade name Silton JC-30 manufactured by Mizusawa Industrial Chemicals Company, Limited.
B-2: Sodium aluminosilicate with a trade name Silton AMT-30 manufactured by Mizusawa Industrial Chemicals Company, Limited.
B-3: Aluminosilicate with a trade name Insulite MC-6 manufactured by Mizusawa Industrilal Chemicals Company, Limited
B-4: Diatomaceous earth with a trade name Dicalite WF manufactured by Grefco, Mineral, Inc.
B-5: Synthetic silica with a trade name Mizucasil P-707 manufactured by Mizusawa Industrial Chemicals Company, Limited Preparation of the Thermoplastic Resin Composition 0.2 part by weight of anti-oxidant A-2, 0.1 part by weight of B-1 above, and 0.1 part by weight of calcium stearate were blended with 100 parts by weight of polyethylene powder, which is not stabilized, and the resulting mixture was granulated with a mono-axis extruder to give pellets.

Measurement of the Amount of Solid Acid of the Inorganic Anti-Blocking Agent 1

2 g of anti-blocking agent B-1 was charged in a sedimentation tube, and 50 ml of 0.02 N diethanolamine solution in methyl isobutyl ketone were added thereto and the resulting mixture was subjected to ultrasonic dispersion for 1 hr. Then obtained solution was subjected to centrifugation at 13000 rpm for 30 min to give a supernatant. 10 ml of the isolated supernatant were diluted with 100 ml of methyl isobutyl ketone. The diluted solution was back-titrated with 0.01 N perchloric acid solution in methyl isobutyl ketone, and the amount (μmol) of the solid acid per g of the sample B-1 was determined.

Measurement of the Amount of Solid Acid of the Inorganic Anti-Blocking Agent 2

1 g of the anti-blocking agent B-5 was charged in a sedimentation tube, and 50 ml of 0.02 N diethanolamine solution in methyl isobutyl ketone were added thereto and the resulting mixture was subjected to ultrasonic dispersion for 1 hr. Then obtained solution was subjected to centrifugation at 13000 rpm for 30 min to give a supernatant. 10 ml of the isolated supernatant were diluted with 100 ml of methyl isobutyl ketone. The diluted solution was back-titrated with 0.01 N perchloric acid solution in methyl isobutyl ketone, and the amount (μmol) of the solid acid per g of B-5 was determined.

Storage Stability Test

The pellets prepared as above were stored at 50° C. and at 80% relative humidity. Thereafter, the solution containing the phosphorous type antioxidant, obtained by Soxhlet extraction, was analyzed by gas-chromatography or high-performance liquid chromatography to determine the content of the anti-oxidant(s) in the pellets. The residual ratio (%) of the phosphorous type antioxidant after the storage was calculated against the initial amount of the anti-oxidants as being 100.

Anti-Oxidation Property after Accelerated Storage

The pellets prepared as above were stored at 50° C. and at 80% relative humidity. Thereafter, the time from the start of heating to the exothermic release of heat, that is, the oxidation induction time was measured by DSC under air atmosphere at 210° C. as a measure of the oxidative stability of the pellets (i.e. the longer the oxidation induction time, the greater the oxidative stability of the pellets).

Examples 1 to 9 and Comparative Examples 1 to 3

Pellets used in Examples 1 to 8 and Comparative Examples 1 to 3 were prepared in a similar manner as the preparation method described above. The pellets used in Example 8 were prepared in a similar manner as above except that 0.3 part by weight of calcium stearate was added. The pellets of Examples 9 were also prepared in a similar manner as above except that 0.3 part by weight of calcium hydroxide was added. The amounts of the solid acid of the anti-blocking agents used in the Examples were measured in a similar manner as the measurement example 1 above.

The amounts of the solid acid of the anti-blocking agents used in the Comparative Examples were measured in a similar manner as the measurement example 2 above.

TABLE 1

| Ex. | Anti-oxidant/ Amount (part) | Anti-blocking agent/ Solid acid (μmol)/ Amount (part) | Hydrolysis resistance After storage | |
|---|---|---|---|---|
| | | | 14 days (%) | 28 days (%) |
| Comp. 1 | A-1/0.2 | B-1/9/0.1 | 94 | 88 |
| 1 | A-2/0.2 | B-1/9/0.1 | 100 | 100 |
| 2 | A-2/0.2 | B-2/10/0.1 | 100 | 100 |
| 3 | A-2/0.2 | B-3/46/0.1 | 100 | 100 |
| 4 | A-2/0.2 | B-4/10/0.1 | 100 | 100 |
| 5 | A-2/0.17 | B-1/9/1.0 | 100 | 100 |
| 6 | A-2/0.17 | B-1/9/5.0 | 100 | 100 |
| 7 | A-2/0.17 | B-1/9/17.0 | 100 | 92 |
| 8 | A-2/0.17 | B-1/9/17.0 | 100 | 100 |
| 9 | A-2/0.17 | B-1/9/17.0 | 100 | 100 |

"Comp." is an abbreviation of comparative.

TABLE 2

| Comp. Ex. | Anti-oxidant/ Amount (part) | Anti-blocking agent/ Solid acid (μmol)/ Amount (part) | Hydrolysis resistance After storage | |
|---|---|---|---|---|
| | | | 14 days (%) | 28 days (%) |
| 2 | A-1/0.2 | B-5/325/0.1 | — | 15 |
| 3 | A-2/0.2 | B-5/325/0.1 | 21 | 14 |

The invention claim is:
1. A thermoplastic resin composition consisting essentially of:
    100 parts by weight of a thermoplastic resin, (A) 0.001 to 1 part by weight of at least one antioxidant selected from compounds of formula (A-I):

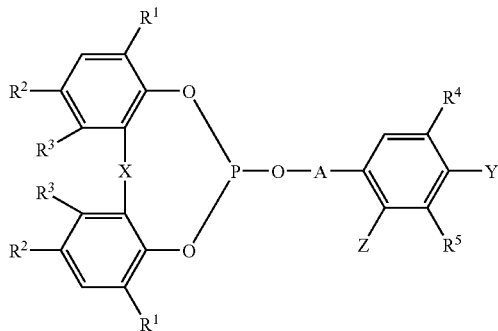

wherein $R^1$, $R^2$, $R^4$ and $R^5$ independently represent hydrogen, $C_{1-8}$ alkyl, $C_{5-8}$ cycloalkyl, $C_{6-12}$ alkylcycloalkyl, $C_{7-12}$ aralkyl, or phenyl,
$R^3$ represents hydrogen, or $C_{1-8}$ alkyl,
X represents a single bond, sulfur atom, or —$CHR^6$—,
wherein $R^6$ represents hydrogen, $C_{1-8}$ alkyl, or $C_{5-8}$ cycloalkyl,
A represents $C_{2-8}$ alkylene, or a group of formula:
*—$COR^7$—, wherein $R^7$ represents a single bond or $C_{1-8}$ alkylene, and the bond indicated by * means that said bond is connected with the phosphite oxygen atom of the formula (A-I),
either one group of Y and Z represents hydroxyl, $C_{1-8}$ alkoxy, or $C_{7-12}$ aralkyloxy, and the other group represents hydrogen or $C_{1-8}$ alkyl, and
provided that when Y is hydroxyl one of $R^4$ and $R^5$ represents $C_{3-8}$ alkyl, $C_{5-8}$ cycloalkyl, $C_{6-12}$ alkylcycloalkyl, $C_{7-12}$ aralkyl or phenyl, and
two $R^1$ groups, two $R^2$ group and two $R^3$ groups each may be the same or different, (B) 0.001 to 150 parts by weight of an inorganic anti-blocking agent having a solid acid in the amount of 50 μmol or less per 1 g of the inorganic anti-blocking agent, and optionally
(C) at least one additive selected from the group consisting of:
phenolic antioxidants other than the antioxidant (A), phosphorus antioxidants other than the antioxidant (A), lubricants, anti-static agents, and pigments.

2. A thermoplastic resin composition according to claim 1, wherein the thermoplastic resin is polyolefin or polystyrene resin.

3. A process for producing the thermoplastic resin composition of claim 1, which comprises mixing
100 parts by weight of a thermoplastic resin as defined,
(A) 0.001 to 1 part by weight of the at least one antioxidant selected from compounds of formula (A-I) as defined,
(B) 0.00 1 to 150 parts by weight of an inorganic anti-blocking agent having a solid acid in the amount of 50 μmol or less per 1 g of the inorganic anti-blocking agent, and optionally
(C) at least one additive selected from the group consisting of:
phenolic antioxidants, other than the antioxidant (A), phosphorus antioxidants other than the antioxidant (A), lubricants, anti-static agents, and pigments, and
melt-kneading the resulting mixture.

4. A thermoplastic resin composition according to claim 1, wherein at least one antioxidant (A) is used in the amount of 0.01 to 0.5 part by weight per 100 parts by weight of the thermoplastic resin composition.

5. A thermoplastic resin composition according to claim 1, wherein the inorganic anti-blocking agent is used in the amount of 0.05 to 20 parts by weight per 100 parts by weight of the thermoplastic resin composition.

* * * * *